(12) United States Patent
Knapp et al.

(10) Patent No.: US 12,496,899 B2
(45) Date of Patent: Dec. 16, 2025

(54) WORK MACHINE

(71) Applicant: Liebherr-Werk Bischofshofen GmbH, Bischofshofen (AT)

(72) Inventors: Hans Knapp, Bischofshofen (AT); Gerald Heugenhauser, Goldegg (AT); Christoph Kiegerl, Werfenweng (AT); Reinhard Dengg, Tamsweg (AT); David Sagorz, Bad Hofgastein (AT)

(73) Assignee: LIEBHERR-WERK BISCHOFSHOFEN GMBH, Bischofshofen (AT)

( * ) Notice: Subject to any disclaimer, the term of this patent is extended or adjusted under 35 U.S.C. 154(b) by 638 days.

(21) Appl. No.: 17/821,135

(22) Filed: Aug. 19, 2022

(65) Prior Publication Data

US 2023/0059902 A1   Feb. 23, 2023

(30) Foreign Application Priority Data

Aug. 19, 2021 (DE) .................. 10 2021 121 512.9
May 9, 2022 (DE) .................. 10 2022 111 432.5

(51) Int. Cl.
*B60K 15/03* (2006.01)
*E02F 9/08* (2006.01)

(52) U.S. Cl.
CPC ...... *B60K 15/03006* (2013.01); *E02F 9/0883* (2013.01); *B60K 2015/03118* (2013.01); *B60K 2015/03184* (2013.01); *B60K 2015/03315* (2013.01); *B60Y 2200/411* (2013.01)

(58) Field of Classification Search
CPC ................. E02F 9/0883; B60K 15/067; B60K 2015/03315
See application file for complete search history.

(56) References Cited

U.S. PATENT DOCUMENTS

| | | | |
|---|---|---|---|
| 8,661,793 B2 * | 3/2014 | Yamashita | E02F 9/0883 60/297 |
| 11,988,339 B2 * | 5/2024 | Woo | E02F 9/207 |
| 2015/0259877 A1 * | 9/2015 | Nishikawa | B60K 13/04 296/190.01 |
| 2021/0396354 A1 * | 12/2021 | Takano | F16J 13/12 |
| 2022/0194218 A1 * | 6/2022 | Woo | B66F 9/07518 |

FOREIGN PATENT DOCUMENTS

DE   10063174 A1 *   6/2002   .......... B66F 9/07554

* cited by examiner

*Primary Examiner* — Kevin Hurley
*Assistant Examiner* — Hosam Shabara
(74) *Attorney, Agent, or Firm* — McCoy Russell LLP

(57) ABSTRACT

A work machine, more particularly a wheeled loader, having a cab for the operator of the work machine, wherein the work machine has a drive which can be operated with hydrogen and that one or more tanks for receiving hydrogen are provided, wherein components for receiving the tanks are provided, wherein the tank or tanks are arranged below the cab and, when the work machine is viewed from above, next to the cab of the work machine, wherein the components for receiving the tanks do not have a direct mechanical connection to the cab, and that an armor is provided which partially or completely surrounds the tank.

11 Claims, 5 Drawing Sheets

WORK MACHINE

CROSS REFERENCE TO RELATED APPLICATIONS

The present application claims priority to German Patent Application No. 10 2021 121 512.9 filed on Aug. 19, 2021, and German Patent Application No. 10 2022 111 432.5 filed on May 9, 2022. The entire contents of each of the above-listed applications are hereby incorporated by reference for all purposes.

TECHNICAL FIELD

The present invention relates to a work machine, more particularly a wheeled loader, having a cab for the operator.

BACKGROUND

From the prior art, work machines are known to have a traction drive generally an internal combustion engine, usually a diesel motor.

As part of decarbonization efforts, alternative drive concepts and alternative energy sources are desired.

SUMMARY

The present invention therefore addresses the problem of developing a work machine of with lower $CO_2$ emissions.

According to the invention it is provided for the work machine to have a drive using hydrogen fuel. One or more tanks for receiving hydrogen are provided, with the tank or tanks arranged below the cab and, when the work machine is viewed from above, next to the cab of the work machine. The work machine includes, an armor which partially or completely surrounds the tank.

The present invention is therefore based on the concept of providing a hydrogen-driven work machine, wherein it is simultaneously ensured that the hydrogen tank is sufficiently protected against damage, is arranged as far away as possible from hot or ignitable environments, is arranged with consideration of the all-round view and as few different installation locations as possible are needed in the vehicle, optionally by arranging several individual tanks in one region and the hydrogen tank, and is easily accessible for maintenance or repair work.

The arrangement of the tank or tanks next to and under the cab ensures that the view of the machine operator in the cab is not impaired.

The arrangement of the tank or tanks has the further advantage that a completely new vehicle concept does not have to be developed. Rather, the known vehicle structure can be largely retained.

To ensure sufficient protection, solid cladding in the form of an armor is provided.

The work machine can have two or more axles, wherein the tank is preferably arranged in the region between the axles, i.e. behind the front axle and in front of the rear axle.

In comparison to conventional work machines with a rigid frame, the articulation region on the wheeled loader is located between the axles. During travel, the position of the front and rear section with respect to one another constantly changes as a result of steering operations. This may be taken into consideration in the design of the armor.

It is preferably provided for the work machine to have a frame, and for the armor to be arranged outside of the frame. This region, in contrast to the rear and front side of the work machine, is well protected against external influences.

The armor is arranged in the vicinity of the supporting structure outside of the vehicle frame, which makes it possible to achieve the same high degree of protection against mechanical damage through external influences as offered by arranging the tank or tanks within the vehicle frame, where the hydrogen tanks are usually arranged due to the particularly high need for protection. In alternative embodiments, arranging the tank or tanks within the vehicle frame is also covered by the present invention.

In some aspects, on both sides of the cab or of the vehicle basic frame, i.e. right and left, at least one tank for receiving hydrogen is arranged, in each case with the armor.

Thus the tanks for storing hydrogen are installed in the protected regions between the drive axles, outside left and right in each case in the region under the driver's cab of the hydrogen-driven wheeled loader or another work machine.

The tank can be any tank suitable for storing hydrogen in liquid and/or gaseous form and/or in bonded form, e.g. as metal hydride.

In a further embodiment, it is provided that the work machine has steps for accessing the cab are located in the rear region of the work machine.

The tank or tanks with armor can adopt the current installation location of the means of access to the driver's cab, and therefore in this embodiment, the steps for access are instead accommodated in the rear of the vehicle, preferably in the region of the ballast weights.

It is conceivable that the work machine has an internal combustion engine for the combustion of hydrogen.

Also conceivable is a fuel cell drive with an electrified drivetrain for driving an electric motor which serves as the traction motor for the wheeled loader.

In a further embodiment, the tank has an elongate form and can be arranged upright. The tank can be arranged in any manner.

It is advantageous if the tank is not fixedly connected to the work machine and is instead replaceable. This offers the advantage of replacing a defective tank or simply replacing an empty tank with a full tank.

It is noted that the present application covers a work machine both with an empty tank and with a hydrogen-filled tank.

At this juncture, it is noted that the term "a" does not necessarily refer to exactly one of these elements, even if this is one possible embodiment, and can also relate to a plurality of the elements. Similarly, the use of the plural form includes the presence of the element in question in the singular, and, vice versa, the singular form also covers a plurality of the elements in question. Furthermore, all the features of the invention described here can be combined with one another in any way or claimed independently of one another.

Further details and advantages of the invention are explained in more detail on the basis of an embodiment shown in the drawing.

BRIEF DESCRIPTION OF THE FIGURES

The figures are drawn approximately to scale, although other relative dimensions may be used.

DETAILED DESCRIPTION

Figure 1:
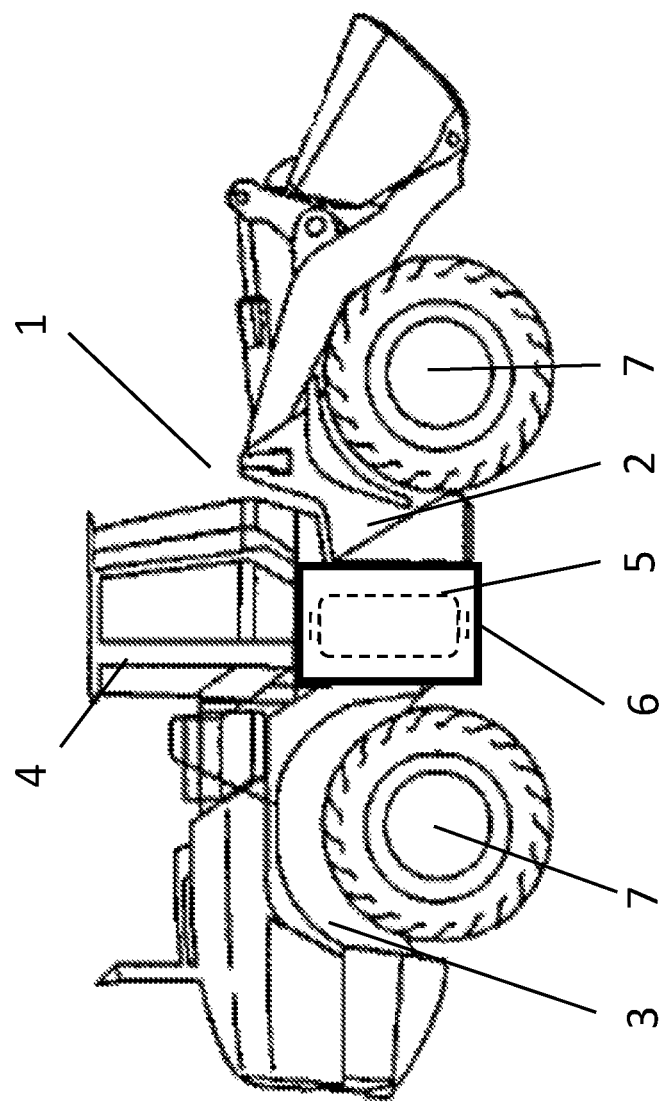
FIG. 1 shows a schematic side view of a wheeled loader from the right.
Figure 2:
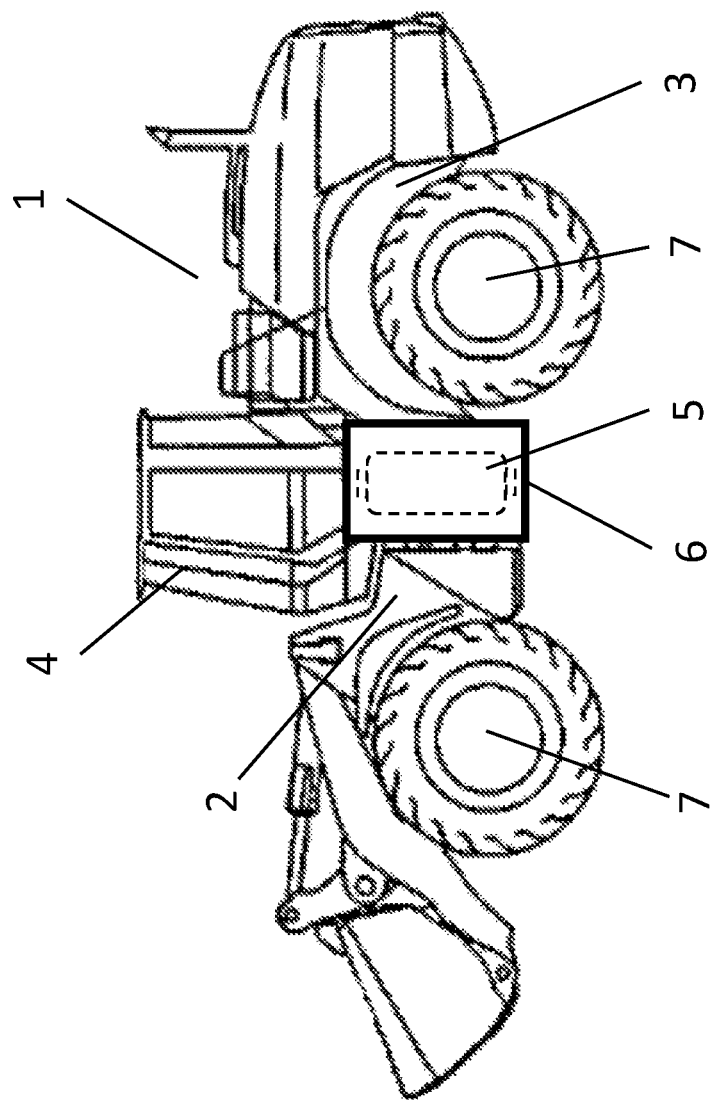
FIG. 2 shows a schematic side view of a wheeled loader from the left.

FIGS. 1 and 2 show side views of a wheeled loader 1 according to an embodiment.

The wheeled loader has a front chassis section 2 and a rear chassis section 3, which are connected to one another in an articulated manner.

Reference sign 4 denotes the cab for the operator of the wheeled loader.

The wheeled loader furthermore has a front axle and a rear axle, both of which are denoted by reference sign 7.

As can be seen from FIGS. 1 and 2, there is a hydrogen tank 5 located on each side of the wheeled loader, in each case surrounded by an armor 6. The wheeled loader has components for receiving the tanks, where the components for receiving the tanks do not have a direct mechanical connection to the cab.

The tank 5 and the armor 6 are, on both sides of the wheeled loader, located on the rear chassis section 3 in a region under the cab 4 and between the two axles 7.

Figure 3:
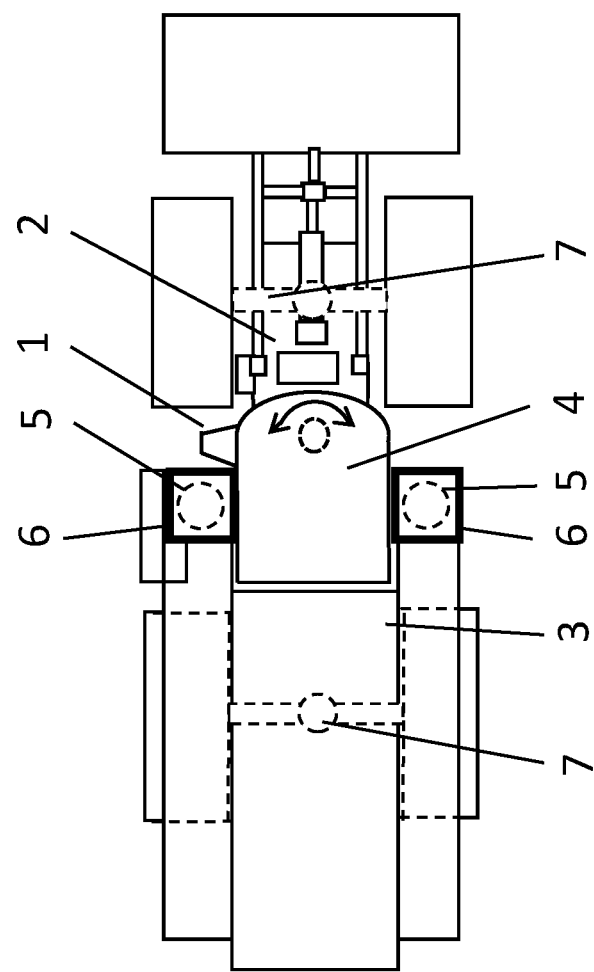
FIG. 3 shows a schematic top view of the wheeled loader.
Figure 4:
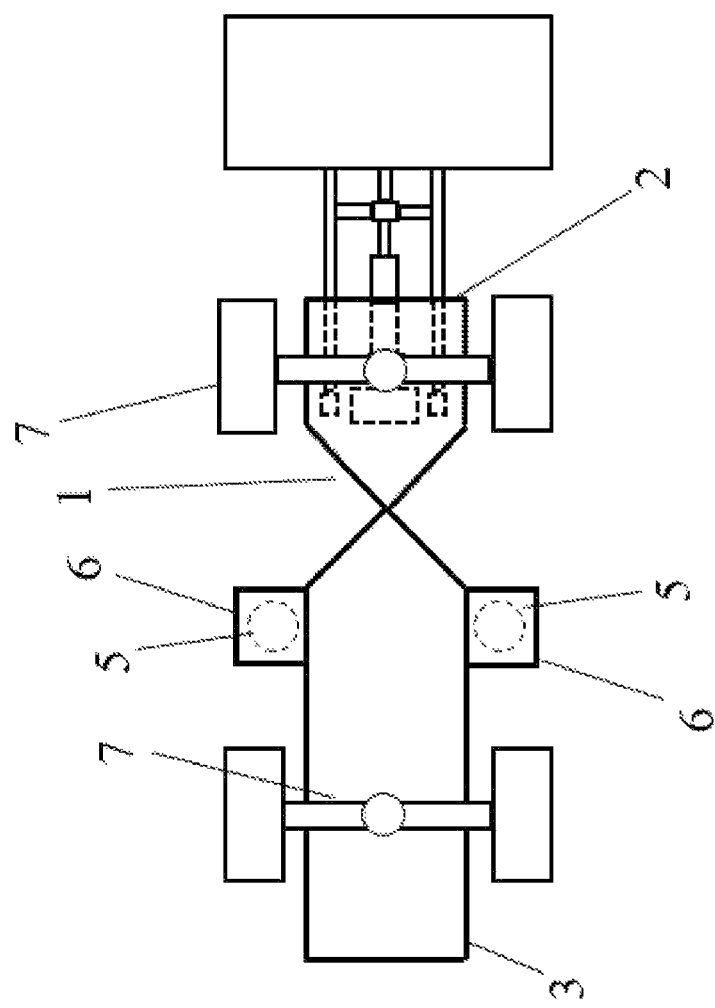
FIG. 4 shows a schematic view of a wheeled loader from below.

From the top view according to FIG. 3 and the illustration from below according to FIG. 4, it is discernible that the two tanks 5 with the respective armor 6 are arranged next to the cab 4, i.e. arranged offset to the side relative to the cab 4.

The armor 6 in each case surrounds of the tanks 5 completely, i.e. on all sides.

Figure 5:
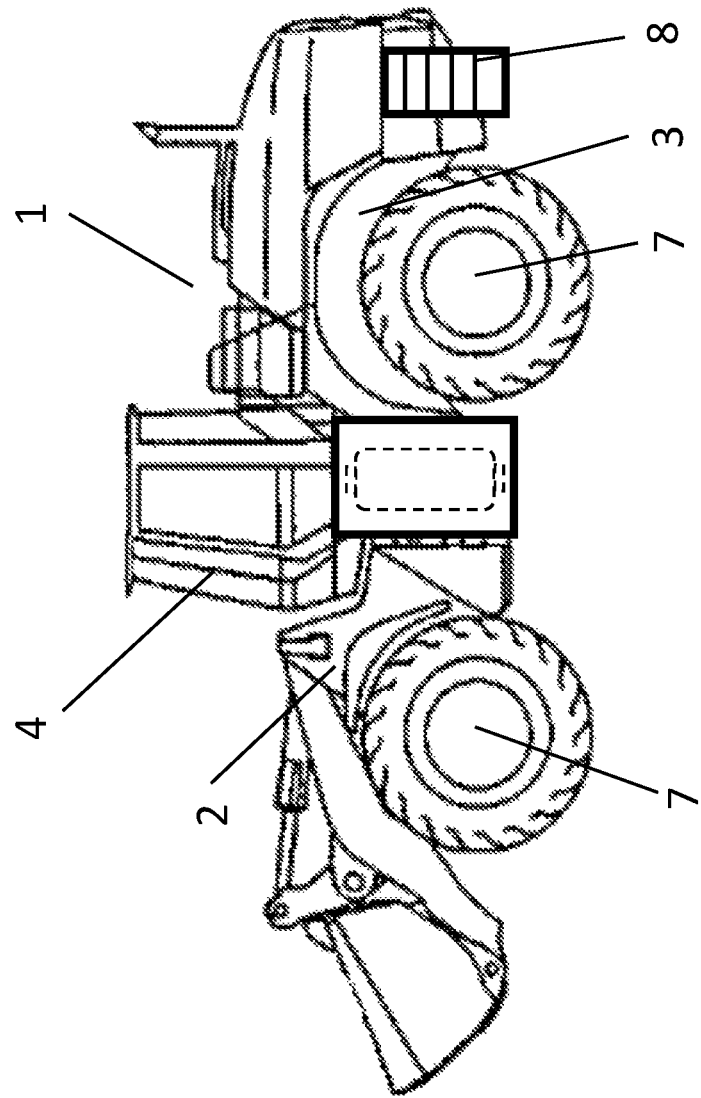
FIG. 5 shows a schematic view of the wheeled loader from the left with the means of access moved to the rear.

FIG. 5 shows an embodiment which corresponds to the embodiment of FIGS. 1 and 2 but with the difference that the stairs or other means of access 8 for the machine operator is arranged in the rear region, i.e. behind the rear axle 7.

After accessing, the machine operator walks forward to the cab 4 over the rear wheel house or body parts.

The invention claimed is:

1. A work machine comprising:
   a front chassis section and a rear chassis section which are connected to one another in an articulated manner;
   a cab for an operator of the work machine;
   one or more hydrogen tanks;
   an armor which at least partially surrounds each tank of the one or more hydrogen tanks; and
   a drive which can be operated with hydrogen,
   wherein the one or more hydrogen tanks are located on the rear chassis section and are arranged below the cab on at least a first side.

2. The work machine according to claim 1, wherein the work machine has two or more axles, and that at least one tank of the one or more hydrogen tanks is arranged in an articulation region, between the two or more axles.

3. The work machine according to claim 1, wherein the work machine has a frame and the armor is arranged outside of the frame.

4. The work machine according to claim 1, wherein on both sides of the work machine, at least one tank of the one or more hydrogen tanks having the armor is arranged.

5. The work machine according to claim 1, wherein the one or more hydrogen tanks are suitable for storing hydrogen in liquid and/or gaseous form and/or in bonded form.

6. The work machine according to claim 1, wherein the work machine has steps for accessing the cab and the steps are located in a rear region of the work machine.

7. The work machine according to claim 1, further comprising an internal combustion engine for the combustion of hydrogen.

8. The work machine according to claim 1, further comprising a fuel cell for generating electrical energy by means of hydrogen.

9. The work machine according to claim 1, wherein at least one tank of the one or more hydrogen tanks has an elongate form.

10. The work machine according to claim 1, wherein the one or more hydrogen tanks are not fixedly connected to the work machine and are replaceable.

11. The work machine according to claim 1, wherein there are at least two hydrogen tanks.

* * * * *